April 28, 1931.   O. DOBLHOFF   1,802,633
APPARATUS FOR DEPOSITING LUMP AND GRANULAR MATERIAL
Filed Jan. 18, 1927    2 Sheets-Sheet 1

O. Doblhoff
INVENTOR

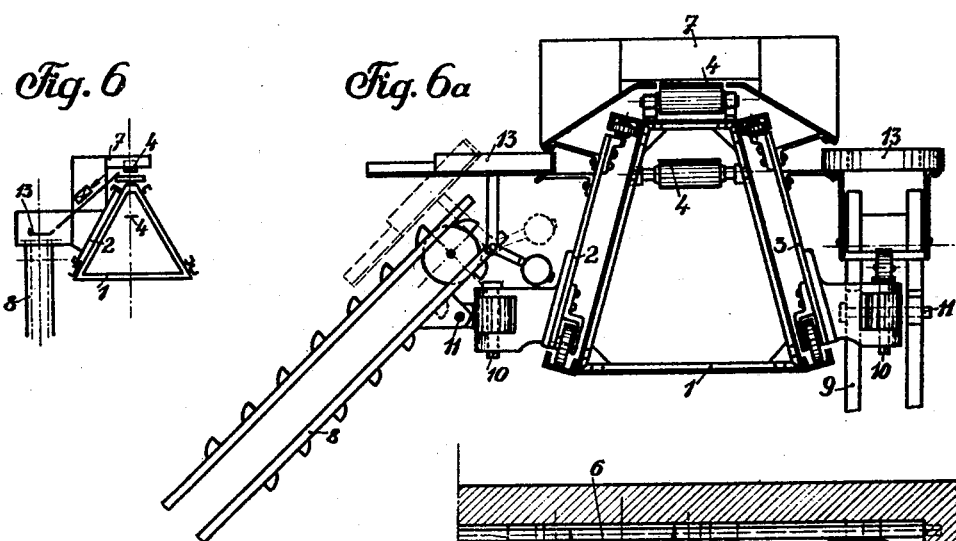
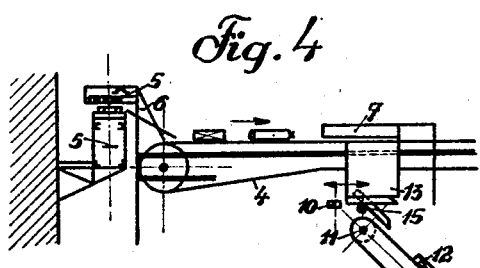
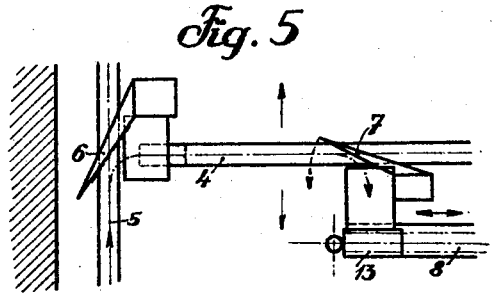
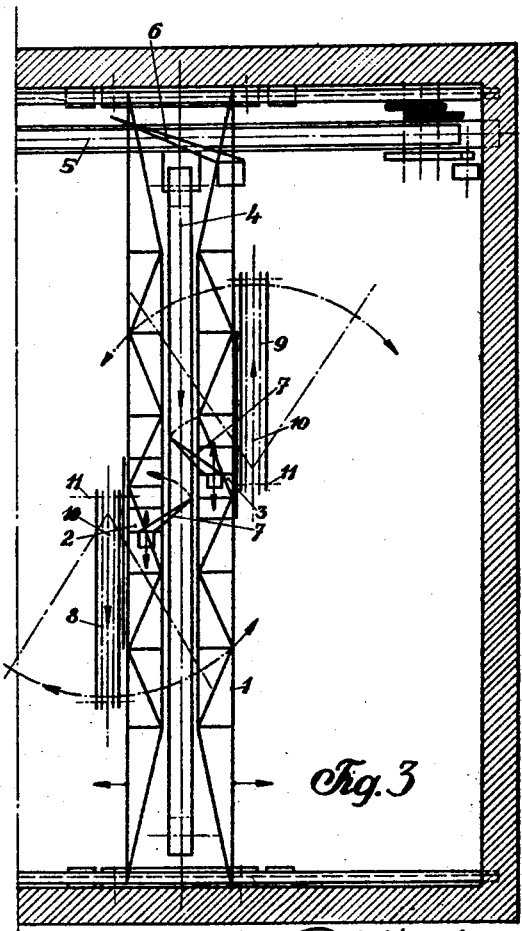

Patented Apr. 28, 1931                                                  1,802,633

UNITED STATES PATENT OFFICE

OTTO DOBLHOFF, OF CAKOVIC, NEAR PRAGUE, CZECHOSLOVAKIA

APPARATUS FOR DEPOSITING LUMP AND GRANULAR MATERIAL

Application filed January 18, 1927, Serial No. 161,926, and in Czechoslovakia January 22, 1926.

This invention relates to apparatus for depositing lump and granular material in store houses or elsewhere, comprising a combination of conveyor belts and transferring devices for effecting the loading of a storage space or the like.

The invention has for its object to provide an improved apparatus of the character referred to which will be capable of directly depositing the material at any part of the storage space and at any level thereof without the necessity of employing additional transportation devices.

The invention is illustrated by way of example in the accompanying drawings, wherein Figure 1 is a side elevation,
Figure 2 an end elevation and
Figure 3 a plan of the depositing apparatus.

Figures 4, 5 and 6 show respectively in end elevation, in plan and in side elevation (partly in section) a constructional form of the apparatus for charging with lump material the loading conveyor belts by means of which the material is deposited in the storage space.

Figure 6a shows a detailed view of Figure 6 on a larger scale.

Figure 1:
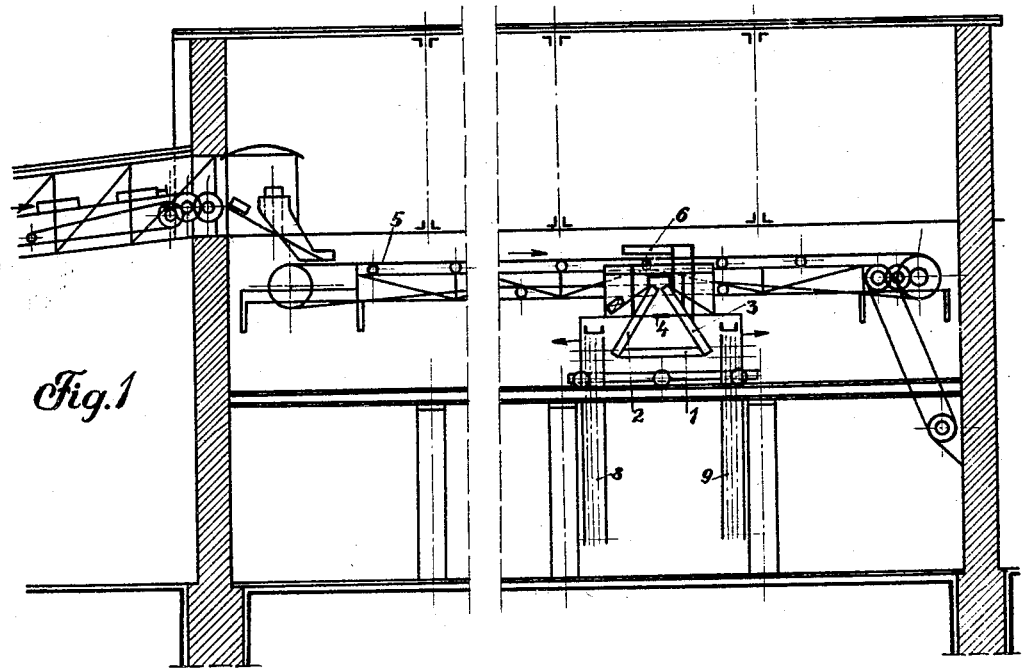
Figure 2:
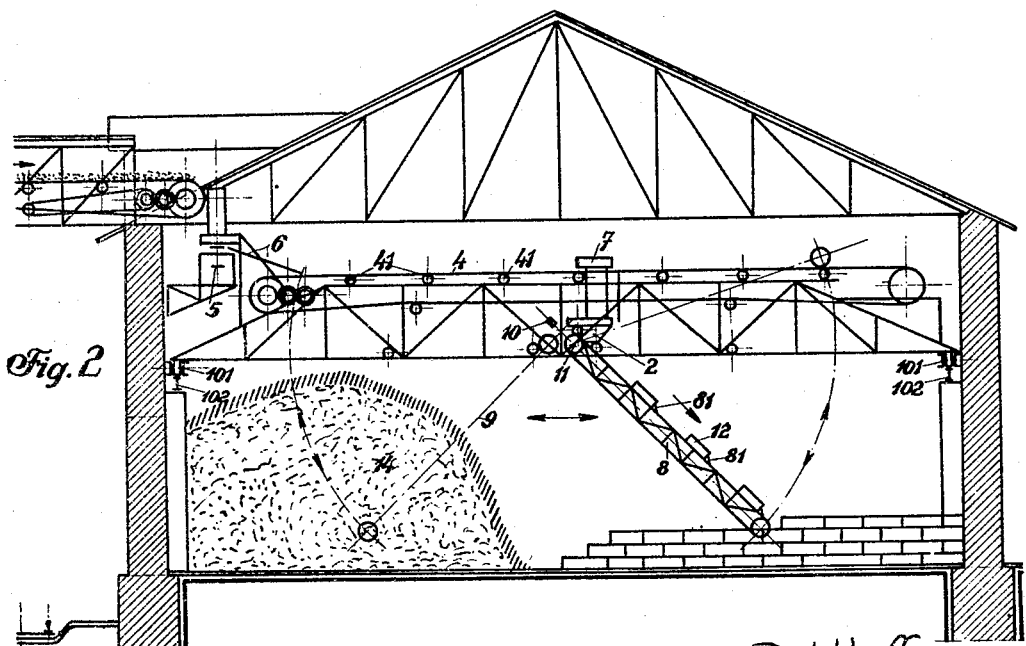

The apparatus shown in Figures 1 to 6, comprises essentially a girder frame 1 provided at each end with wheels 101 for supporting it on rails 102 mounted on supports extending along opposite sides of the storage space, the girder frame being thus capable of travelling in a direction transversely to its length over the storage space. Upon the girder frame 1 is arranged a feeding conveyor belt 4 which travels transversely to the direction of travel of the girder frame over rollers 41 journalled in the girder. The material is supplied to the conveyor belt 4 from a main transporter comprising a conveyor belt 5 by means of a chute 6. Mounted on the girder frame 1 so as to be capable of travelling thereon tranversely to the direction of travel of the girder frame are trucks 2, 3 on which are supported at one end the loading conveyor belts 8, 9 to which the material is transferred from the conveyor belt 4 in a direction transversely to its direction of movement on the conveyor belt 4, by means of strippers or switches 7. The loading conveyor belts 8, 9 are pivoted to the trucks 2, 3, in known manner so as to be capable of rocking about two axes 10, 11 at right angles to one another as shown in Figures 2 and 6a, so as to enable the belts 8, 9 to be raised and lowered as shown in Figure 2 from a lower position in full lines to a higher position shown in dot and dash lines, so as to enable the material to be deposited at different levels in the storage space, as well as to be swivelled about the trucks 2, 3 in an arc as shown in Figure 3. By this means the belts 8, 9 are capable of depositing the material at the desired point of the available storage space and are constructed to suit the nature of the material being deposited. As shown in Figures 4, 5 and 6 and the right hand side of Figure 2, the conveyor belt 8 is designed for dealing with packages which are engaged by ribs 81 on the belt.

The material is transferred from the conveyor belt 4 to the conveyor belts 8, 9 by means of stripping devices 7 on the trucks 2, 3. In the construction shown in Figures 4, 5 and 6, the stripping device 7 on the truck 3 deflects the lump material from the belt 4 first of all on to a tip 13 which is pivoted to the truck so as to be capable of rocking about the axis 15 and allowing the lump material to slide in the correct position on to the conveyor belt 8. The strippers 7 extend across the conveyor belt 4 at an angle thereto and intercept the material travelling on the belt in known manner. The mechanism for driving the conveyor belts is not described as the same does not form part of the present invention.

What I claim is:—

Apparatus of the character described, comprising in combination a supporting frame arranged above the storage space and capable of travelling transversely to its length over the storage space, a feeding conveyor belt on said supporting frame arranged thereon so as to travel transversely to the direction of travel of the supporting frame, two trucks, one on each side of said supporting frame, said trucks being mounted on the supporting frame and adapted to travel thereon transversely of the direction of travel of the supporting frame, a delivering conveyor pivoted to each of said trucks, each of said delivering conveyors being oscillatable about a horizontal axis from a position in which its lower end lies at the lowest level of the storage space to a position in which said end lies at the highest level of the storage space and being also oscillatable about a vertical axis so as to enable material to be deposited at any part of the storage space and means operatively connected to said feeding conveyor and said delivering conveyors for transferring material from one conveyor to the other.

In testimony whereof I have signed my name to this specification.

OTTO DOBLHOFF.